(12) United States Patent
Iwamoto et al.

(10) Patent No.: US 8,659,731 B2
(45) Date of Patent: Feb. 25, 2014

(54) LIQUID CRYSTAL DISPLAY ELEMENT

(75) Inventors: Yoshihisa Iwamoto, Yokohama (JP); Kunihiko Katano, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 154 days.

(21) Appl. No.: 13/283,791

(22) Filed: Oct. 28, 2011

(65) Prior Publication Data

US 2012/0105782 A1    May 3, 2012

(30) Foreign Application Priority Data

Oct. 29, 2010 (JP) .................................. 2010-243464

(51) Int. Cl.
*G02F 1/1337* (2006.01)
(52) U.S. Cl.
USPC ............................ 349/129; 349/139; 349/142
(58) Field of Classification Search
USPC .......................................... 349/129, 139, 142
See application file for complete search history.

(56) References Cited

U.S. PATENT DOCUMENTS 7,230,666 B2 *   6/2007   Nishiyama et al. ........... 349/141

FOREIGN PATENT DOCUMENTS

| JP | 4-147216 A | 5/1992 |
|---|---|---|
| JP | 04-223433 A | 8/1992 |
| JP | 4-223433 A | 8/1992 |
| JP | 2004-302370 A | 10/2004 |
| JP | 2005-234254 A | 9/2005 |
| JP | 2010-224233 A | 10/2010 |
| JP | 2010-230863 A | 10/2010 |

OTHER PUBLICATIONS

Extended European Search Report (EESR) dated Dec. 30, 2011 (in English) in counterpart European Application No. 11008527.1.
Japanese Office Action dated Jul. 2, 2013 (and English translation thereof) in counterpart Japanese Application No. 2010-243464.

\* cited by examiner

*Primary Examiner* — Phu Vu
(74) *Attorney, Agent, or Firm* — Holtz, Holtz, Goodman & Chick, PC

(57) ABSTRACT

A liquid crystal display element comprises a pair of substrates facing each other with a predetermined gap, strips of first electrodes formed on one substrate, strips of second electrodes formed on another substrate and crossing the first electrodes, an alignment film formed on at least one of the substrates and treated with an alignment process in a direction not perpendicular to a longitudinal direction of the second electrodes, a vertical alignment mode liquid crystal layer placed between the substrates and having a pretilt angle, and a pair of polarizers sandwiching the substrates, wherein the fist and the second electrodes cross each other to form pixels, and non-uniform alignment regions where liquid crystal molecules in a center of a thickness of the liquid crystal layer are aligned in a different direction from the direction defined by the alignment process appear near an edge of each pixel.

2 Claims, 11 Drawing Sheets

FIG. 10A
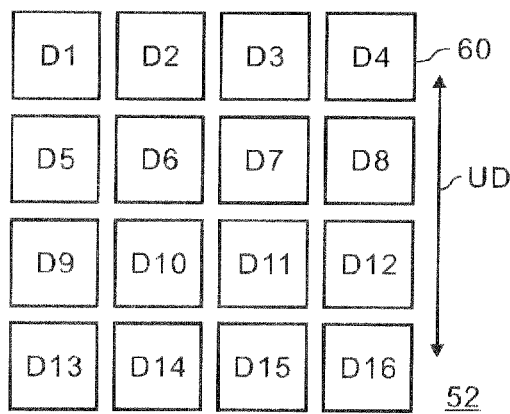
FIG. 10B
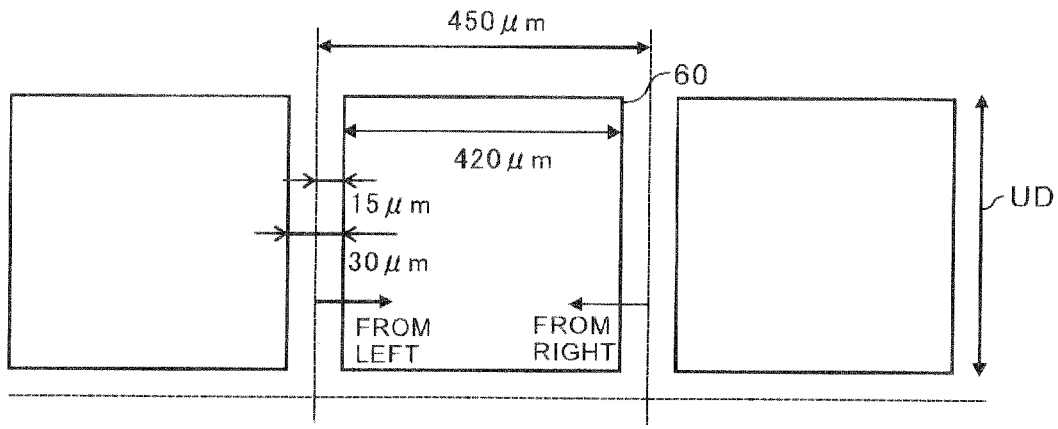
FIG. 10C
| BLACK CROSS POSITIONS (μm FROM LEFT) | | | |
|---|---|---|---|
| DOT | φ=5 | φ=10 | φ=15 |
| D1 | 66 | 44 | 44 |
| D2 | 60 | 38 | 38 |
| D3 | 55 | 44 | 38 |
| D4 | 82 | 44 | 38 |
| D5 | 55 | 44 | 49 |
| D6 | 60 | 44 | 44 |
| D7 | 44 | 44 | 38 |
| D8 | 49 | 44 | 38 |
| D9 | 55 | 49 | 49 |
| D10 | 66 | 44 | 44 |
| D11 | 44 | 44 | 44 |
| D12 | 44 | 33 | 44 |
| D13 | 49 | 55 | 44 |
| D14 | 55 | 44 | 44 |
| D15 | 55 | 44 | 38 |
| D16 | 49 | 44 | 38 |
| AVERAGE | 56 | 44 | 42 |
FIG. 10D
| BLACK CROSS POSITIONS (μm FROM RIGHT) | | | |
|---|---|---|---|
| DOT | φ=-5 | φ=-10 | φ=-15 |
| D1 | 49 | 44 | 44 |
| D2 | 49 | 38 | 44 |
| D3 | 55 | 44 | 44 |
| D4 | 44 | 44 | 38 |
| D5 | 60 | 49 | 44 |
| D6 | 66 | 44 | 44 |
| D7 | 55 | 44 | 38 |
| D8 | 55 | 49 | 44 |
| D9 | 55 | 44 | 38 |
| D10 | 66 | 44 | 44 |
| D11 | 44 | 44 | 38 |
| D12 | 55 | 55 | 38 |
| D13 | 55 | 38 | 60 |
| D14 | 55 | 44 | 44 |
| D15 | 60 | 49 | 38 |
| D16 | 49 | 44 | 38 |
| AVERAGE | 55 | 45 | 43 |

LIQUID CRYSTAL DISPLAY ELEMENT

This application is based on Japanese Patent Application 2010-243464, filed on Oct. 29, 2010, the entire contents of which are incorporated herein by reference.

BACKGROUND OF THE INVENTION

A) Field of the Invention

This invention relates to a liquid crystal display element.

B) Description of the Related Art

A vertical alignment type liquid crystal display element of which liquid crystal molecules in a liquid crystal layer align perpendicular to a substrate has a very good black level performance when no voltage is applied. Moreover, it has a very good viewing angle characteristic by introducing an optical compensator or optical compensators having a negative optical anisotropy with appropriate parameters on one side or both sides of a liquid crystal cell between upper and lower polarizers (for example, refer to Japanese Laid-Open Patent No. 2005-234254).

FIG. 17 is a schematic cross sectional view showing an example of a vertical alignment type liquid crystal display element according to the prior art.

A first substrate (upper substrate) 1 and a second substrate (lower substrate) 2 face each other, and a liquid crystal layer 3 is placed between them. The first substrate 1 consists of a transparent substrate 13, transparent electrodes (segment electrodes) 14 formed on one surface (inside surface facing the second substrate) of the transparent substrate 13, a vertical alignment film 15 coated on the transparent electrodes 14 and whose surface is treated by rubbing in a direction represented by an arrow 18, and a viewing angle compensator 12 and a polarizer 11 arranged on another surface (outside surface not facing the second substrate) of the transparent substrate 13. The second substrate 2, as same as the first substrate 1, consists of a transparent substrate 23, transparent electrodes (common electrodes) 24 formed on one surface (inside surface facing the first substrate) of the transparent substrate 23, a vertical alignment film 25 coated on the transparent electrodes 24 and whose surface is treated by rubbing in a direction represented by an arrow 28, and a viewing angle compensator 22 and a polarizer 21 arranged on another surface (outside surface not facing the first substrate) of the transparent substrate 23. The liquid crystal layer 3 includes liquid crystal molecules which align almost perpendicular to the surfaces of the substrates 1 and 2, and is given a pre-determined pretilt angle from a direction perpendicular to the substrate by the rubbing. Below the lower substrate 2, a back light 4 is placed.

The two upper and lower polarizers 11 and 12 are arranged to approximately crossed Nicols, and the absorption axis of one polarizer is arranged at about 45 degrees from an alignment direction of the liquid crystal molecules in the center of the thickness of the liquid crystal layer (hereinafter called the liquid crystal layer center molecules). The absorption axis is arranged at about 45 degrees to left and right or up and down direction of the liquid crystal display element. The viewing angle compensators 12 and 22 are made of a film having negative uniaxial optical anisotropy or negative biaxial optical anisotropy. In case of a film having negative biaxial optical anisotropy, its in-plane slow axis is preferably perpendicular to the absorption axis of the adjacent polarizer.

In case of the liquid crystal display element shown in FIG. 17, the rubbing directions of the upper and the lower substrates are set to the 12 o'clock direction (the direction represented by the arrow 18) and the 6 o'clock direction (the direction represented by the arrow 28) respectively to align them in an anti-parallel alignment. The liquid crystal material has a negative dielectric anisotropy, and the liquid crystal molecules are varied in the alignment configuration in parallel to the substrate surface in a bulk region of the liquid crystal layer 3 when a voltage is applied between the transparent electrodes 14 and 24 on the upper and the lower substrates.

FIG. 18 is a schematic plan view showing electrode patters of the transparent electrode (segment electrode) 14 and the transparent electrode (common electrode) 24 shown in FIG. 17. The same reference numbers as in FIG. 17 are added to the same components, and so explanations for the same components will be omitted.

In FIG. 18, the upper electrodes are the segment electrodes 14 having a strip (oblong) electrode shape extending to the 6-12 o'clock direction, and the lower electrodes are the common electrodes 24 having a strip (oblong) electrode shape extending to the perpendicular direction to the upper electrodes. Each rectangle region where the segment electrode 14 and the common electrode 24 cross each other composes one pixel.

With the above-described structure, it is possible to arrange an optimal viewing direction with the optimal display quality in the 6 o'clock direction of the liquid crystal display element. On the other hand, there is an anti-viewing direction in a direction rotating 180 degrees from the optimal viewing direction. The anti-viewing direction is a direction from which a light display part becomes very dark and display contrast decreases when observed at a certain polar angle from the direction to the liquid crystal display element. It is possible to obtain relatively good viewing angle properties from the left and right directions of the liquid crystal display element, which are the directions perpendicular to the optimal viewing direction and the anti-viewing direction.

Although there is no twisted alignment by rubbing on the upper/lower substrates in the liquid crystal layer 3, a twisted alignment can be generated by adding chiral dopant to the liquid crystal material. Moreover, it is not necessary to arrange the rubbing directions of the upper and the lower substrates in the anti-parallel alignment. The rubbing process may be performed only to one substrate, and the rubbing directions of the upper and the lower substrates may be twisted each other. In case that the rubbing directions are twisted each other, the alignment of the liquid crystal layer center molecules are aligned to up and down direction of the liquid crystal display element.

In case that the vertical alignment type liquid crystal display element according to the prior art shown in FIG. 17 is observed at a driving voltage which can obtain the maximum contrast, uniformed display is realized in a whole dot matrix display region when viewed from the optimal viewing direction and from the left and right directions of the element even if observation polar angles are changed. On the other hand, display uniformity is not sufficient when viewed from a range of directions rotated by 60 degrees clockwise and counter-clockwise from the anti-viewing direction, and a display quality is considerably dropped especially when viewed from the anti-viewing direction.

SUMMARY OF THE INVENTION

It is an object of the present invention to provide a vertical alignment type liquid crystal display element realizing display uniformity.

According to one aspect of the present invention, there is provide a liquid crystal display element, comprising: a pair of substrates facing each other with a predetermined gap; a plurality of strips of first electrodes formed on a counterface surface of one of the pair of substrates; a plurality of strips of second electrodes formed on a counterface surface of another one of the pair of substrates and crossing the first electrodes; an alignment film formed on the counterface surface of at least one of the pair of substrates and treated with an alignment process in a direction not perpendicular to a longitudinal direction of the second electrodes; a vertical alignment mode liquid crystal layer placed between the pair of substrates and having a pretilt angle; and a pair of polarizers sandwiching the pair of substrates, wherein the fist electrodes and the second electrodes cross each other to form a plurality of pixels, and non-uniform alignment regions where liquid crystal molecules in a center of a thickness of the liquid crystal layer are aligned in a different direction from the direction defined by the alignment process appear near an edge of the pixel in each pixel.

According to the present invention, a vertical alignment type liquid crystal display element realizing display uniformity can be provided.

BRIEF DESCRIPTION OF THE DRAWINGS

FIGS. 10A and 10B are plan views for explaining a method for measuring appearance positions of the black cross intersections, and FIGS. 10C and 10D are tables showing the results of the measurements.

DESCRIPTION OF THE PREFERRED EMBODIMENTS

Figure 17:
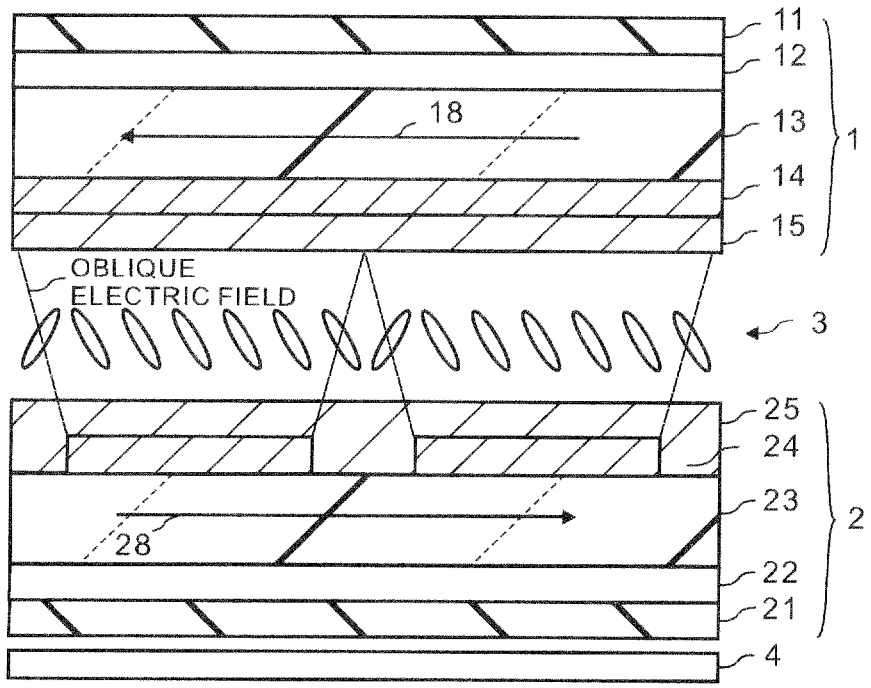
FIG. 17 is a schematic cross sectional view showing one example of the vertical alignment type liquid crystal display element according to the prior art.

When a voltage is applied between the upper and the lower electrodes in the vertical alignment type liquid crystal display element according to the prior art shown in FIG. 17, the liquid crystal molecules are tilted in accordance with the director of the liquid crystal layer center molecules defined by the rubbing direction in almost all the regions where the segment electrode 14 and the common electrode 24 overlap. However, oblique electric fields which is tilted from the up/down direction as represented by broken lines in FIG. 17 are generated in regions such as regions between strips of the common electrodes where one of the pair of electrodes (the segment electrode 14 and the common electrode 24) does not exist in a plan view.

A director of the liquid crystal layer center molecules in those regions is oriented to a direction perpendicular to the oblique electric field; therefore, the regions where the liquid crystal layer center molecules are aligned to different directions from the alignment direction defined by the rubbing directions appear. Each one of those regions appears near an edge of a pixel where the segment electrode 14 and the common electrode 24 cross each other.

Figure 18:
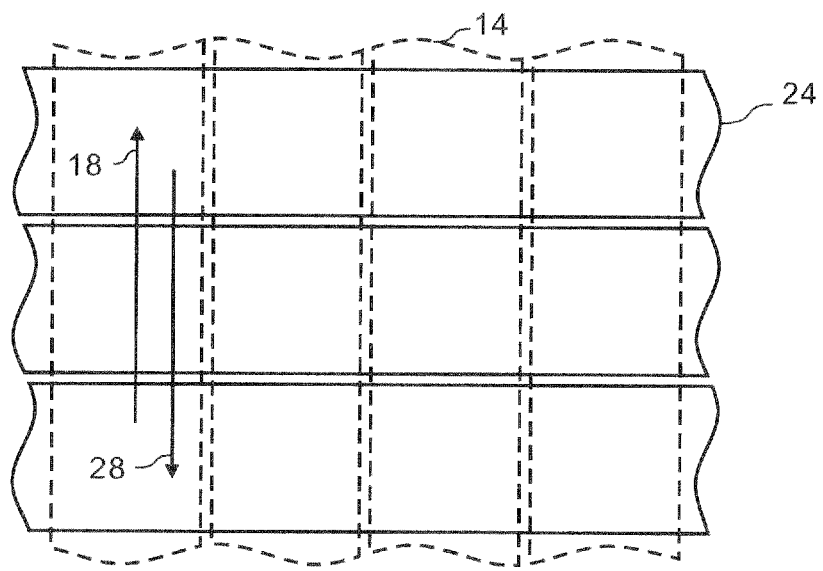
FIG. 18 is a schematic plan view showing dot matrix electrode patterns of the vertical alignment type liquid crystal display element according to the prior art.
Figure 19:
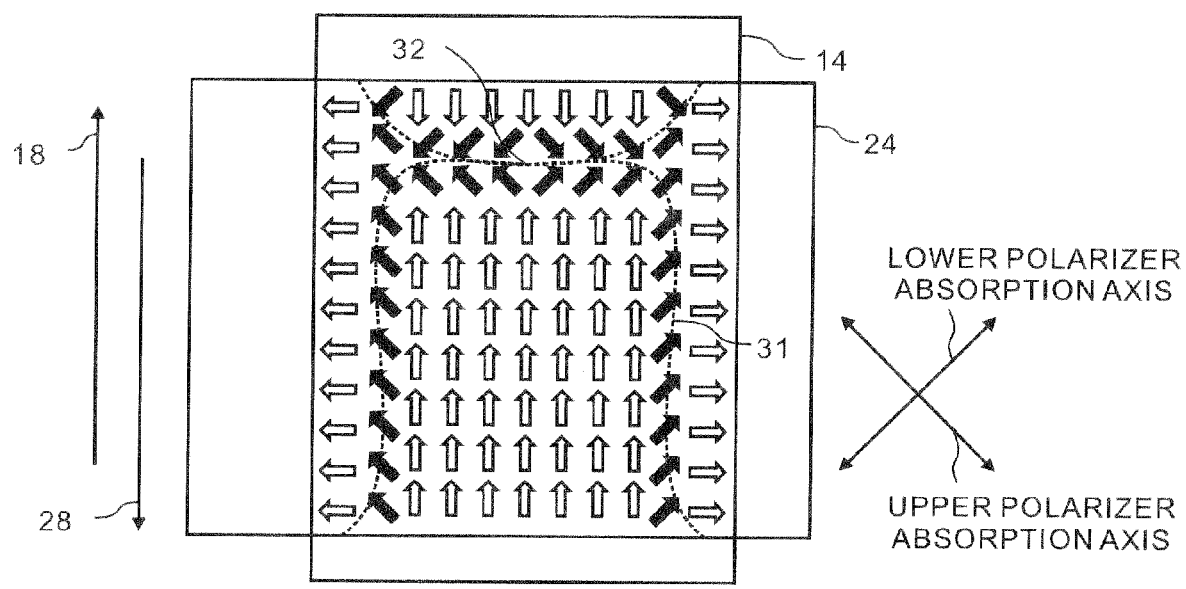
FIG. 19 is a diagram showing a distribution of liquid crystal directors in one pixel when an ON voltage is applied in the electrode structure and alignment direction shown in FIG. 17 and FIG. 18.

FIG. 19 is a diagram showing a distribution of liquid crystal directors in one pixel when an ON voltage is applied in the electrode structure and alignment direction shown in FIG. 17 and FIG. 18. In the figure, the director of the liquid crystal layer center molecules in each region is represented by arrows.

The liquid crystal molecules in the central region of one pixel are uniformly aligned to a direction defined by the rubbing directions 18 and 28 of the segment and common substrate shown in the figure but those near a left edge, a right edge and an upper edge of the pixel tend to be aligned to different directions from the direction defined by the rubbing directions. The oblique electric fields between the segment and the common electrodes generated near the edges of the pixel affects the alignment direction of the liquid crystal molecules near the edges of the pixel.

The director of the liquid crystal layer center molecules tend to continuously rotate in a plan view from the central region to the edges of the pixel. In case that the absorption axes of the polarizers 11 and 12 which are arranged in crossed Nicols are located to cross the director of the liquid crystal layer center molecules at about 45 degrees, a good light display can be obtained in regions where the liquid crystal layer center molecules are aligned in up/down directions and in left/right directions of the pixel. On the other hand, it is observed that a good light display cannot be obtained and transmission tends to drop in regions where the liquid crystal layer center molecules are not aligned to the direction rotated by about 45 degrees from the absorption axes of the polarizers, for example, in the region where the alignment directions of the liquid crystal layer center molecules are continuously rotating in a plan view. As shown in the figure, a region where the alignment directions of the liquid crystal layer center molecules are in parallel to or approximately in parallel to the absorption axes of the upper and the lower polarizers becomes a dark region (a dark line) 31. In this specification, the dark region (a dark line) 31 is called the "black cross". There is a black cross intersection 32 where the linear black crosses 31 cross each other neat the upper edge of the pixel. The "black cross" refers to a linear region consisting of continuously generated non-uniform alignment regions where the liquid crystal layer center molecules are aligned in a different direction from the alignment direction defined by the alignment process. Therefore, the black cross is observed as a dark line where the transmission drops when the pixel as a whole is displaying a good light display.

On the other hand, it is considered that there appears no dark region 31 near a lower edge of the pixel because the alignment direction defined by the rubbing directions and the alignment direction defined by the oblique electric field near the edge are similar directions and the alignment conditions of the liquid crystal molecules are uniformed.

Figure 20:
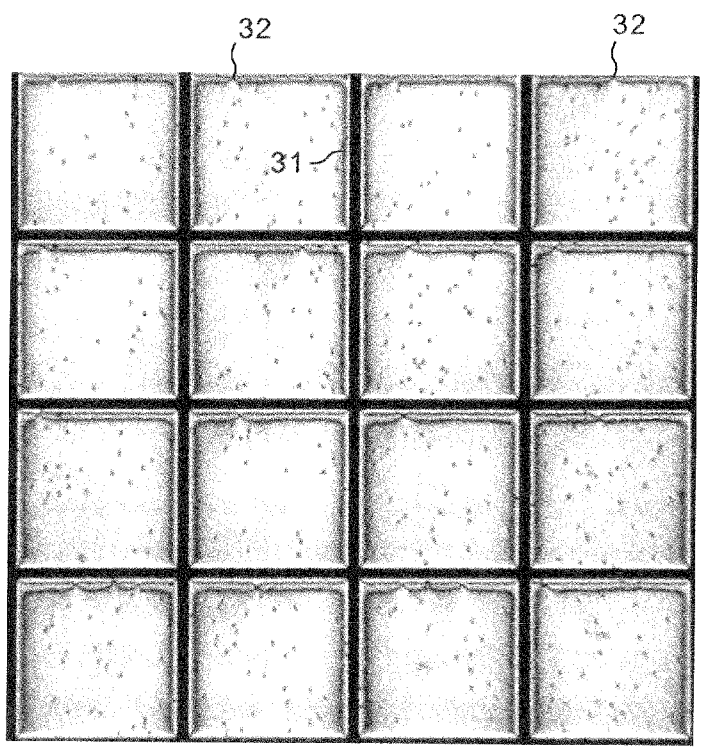
FIG. 20 is a microscopic observation photograph of alignment textures in a light display state of the vertical alignment type liquid crystal display element according to the prior art shown in FIG. 17.

FIG. 20 is a microscopic observation photograph of alignment textures in a light display state of the vertical alignment type liquid crystal display element according to the prior art shown in FIG. 17. In the figure, alignment textures of a total of 16 pixels, four rows and columns of pixels, are shown.

In each pixel, the alignment condition as explained with reference to FIG. 19 was obtained. At least one black cross 31 was observed near the left, right and upper edges of each pixel. Moreover, two or more black crosses 31 existed near the upper edge of each pixel, and at least one intersection 32 where two black crosses 31 crossed each other was observed. It was observed that the intersections 32 are not positioned at points of bilateral symmetry.

Furthermore, by precisely observing the black crosses 31 in the pixels, it was observed that the black cross intersections 32 were positioned at different points from each another. It is considered that each black cross intersection 32 forms a point disclination where the liquid crystal molecules are aligned vertically to the substrate even if a voltage is applied between the electrodes and the liquid crystal molecules are aligned radially from the point disclination. Therefore, viewing angle properties are changed especially near the upper edge when the intersections 32 are positioned at different points from each another in the pixels, and when observation angles are tilted 60 degrees clockwise and counterclockwise from the perpendicular direction of the liquid crystal display element to the polar angular direction with the anti-viewing direction as a center of tilting, differences in viewing angle properties of pixels are recognized and non-uniformity of display is actualized.

Therefore, it is considered that fixing the black cross intersections 32 at the approximately same relative positions in all the pixels by any means can be means for decreasing the non-uniformity of display.

Figure 1:
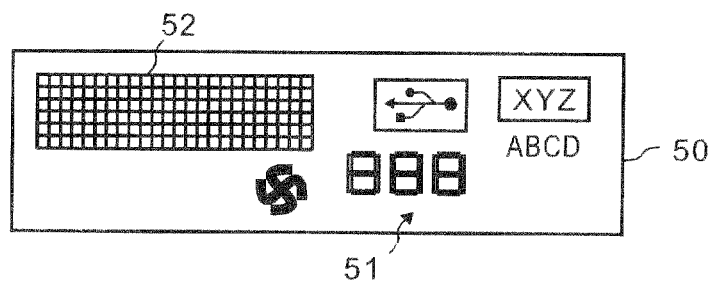
FIG. 1 is a plan view showing a liquid crystal display element 50 according to an embodiment of the present invention.

FIG. 1 is a plan view showing a liquid crystal display element 50 according to an embodiment of the present invention. The liquid crystal display element 50 according to the embodiment of the present invention is a vertical alignment type liquid crystal display element consisting of a dot matrix display region 52 and a segment display region 51 and electrically driven by a multiplex driving method (a simple matrix driving method).

The display regions 51 and 52 of the liquid crystal display element according to the embodiment are normally black mode wherein regions other than display regions are always black. In this mode, liquid crystal molecules in a liquid crystal layer 3 (FIG. 3) are aligned almost perpendicular to a substrate when no voltage is applied, and dark (black) state of cross-Nicols polarizers 12 and 22 (FIG. 3) arranged on a front and a back surfaces of the liquid crystal display element can be almost reproduced.

Figure 2:
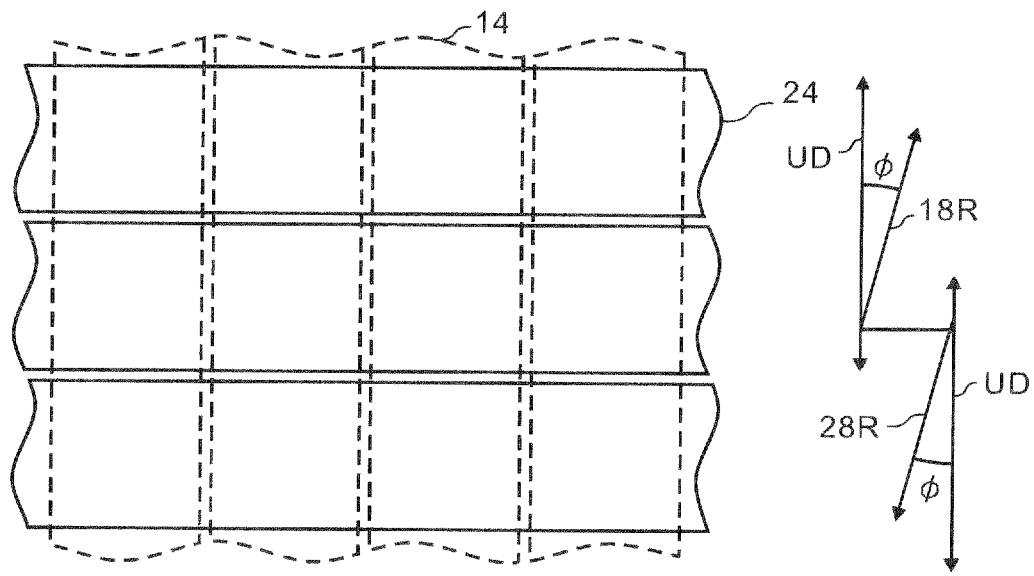
FIG. 2 is a schematic plan view showing electrode patters of transparent electrodes (segment electrodes) 14 and transparent electrodes (common electrodes) 24.

FIG. 2 is a schematic plan view showing electrode patters of transparent electrodes (segment electrodes) 14 and transparent electrodes (common electrodes) 24. This plan view shows the liquid crystal display element 50 shown in FIG. 1 when viewed from a perpendicular direction.

In FIG. 2, the upper electrodes are segment electrodes 14 which are strips of rectangle electrodes extending in a 6-12 o'clock direction, and the lower electrodes are common electrodes 24 which are strips of rectangle electrodes extending in a direction crossing the extending direction (longitudinal direction) of the upper electrodes at a right angle. Each rectangle region where the segment electrode 14 and the common electrode 24 cross (overlap in a plan view) each other composes one pixel.

Rubbing processes are performed to the upper and the lower substrates in directions 18R and 28R rotated by an angle $\phi$ clockwise or counterclockwise from an up/down direction UD of the liquid crystal display element (from the longitudinal direction of the segment electrodes 14 or from the direction crossing the common electrodes 24 at a right angle). In this embodiment, the different rubbing angle $\phi$ is used in order not to cross the rubbing directions 18R and 28R of the upper and the lower substrates with the extending direction (longitudinal direction) of the strips of the common electrodes 24 at a right angle. Moreover, in this specification, the rubbing process in order not to cross the rubbing directions 18R and 28R of the upper and the lower substrates with the extending direction (longitudinal direction) of the strips of the common electrodes 24 at a right angle is called the "oblique rubbing". By that, the director of the liquid crystal layer center molecules will not cross the upper and lower edges of the rectangle pixel at a right angle. Further, it is considered that the same effect can be obtained by other alignment processes which can arrange the director of the liquid crystal layer center molecules not to cross the upper and lower edges of the rectangle pixel at a right angle. Furthermore, it is considered that twisted alignment process can be used as far as the director of the liquid crystal layer center molecules will not cross the upper and lower edges of the rectangle pixel at a right angle.

Figure 3:
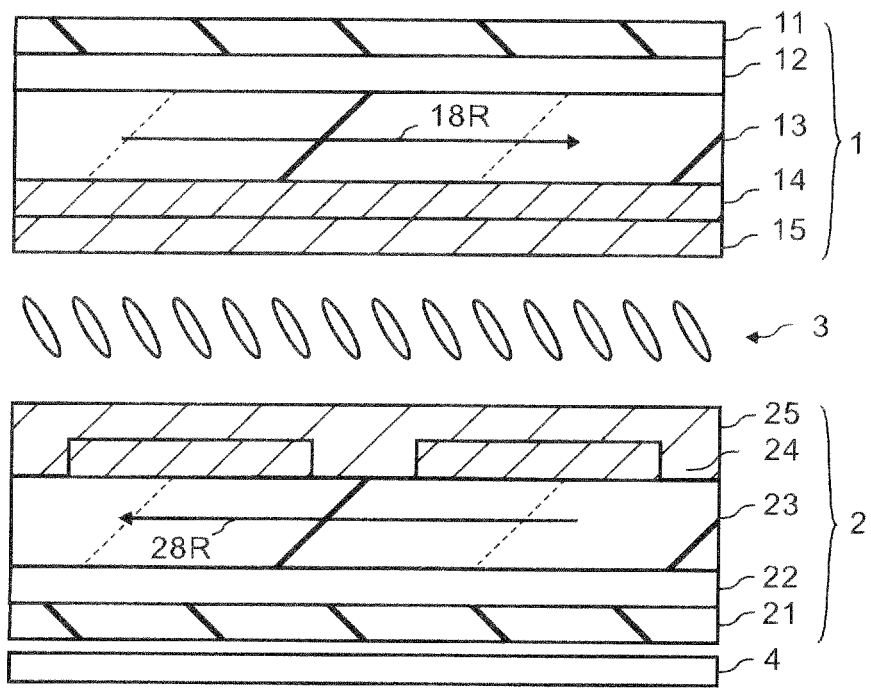
FIG. 3 is a schematic cross sectional view showing a structure of the liquid crystal display element 50 according to the embodiment of the present invention.
Figure 4:
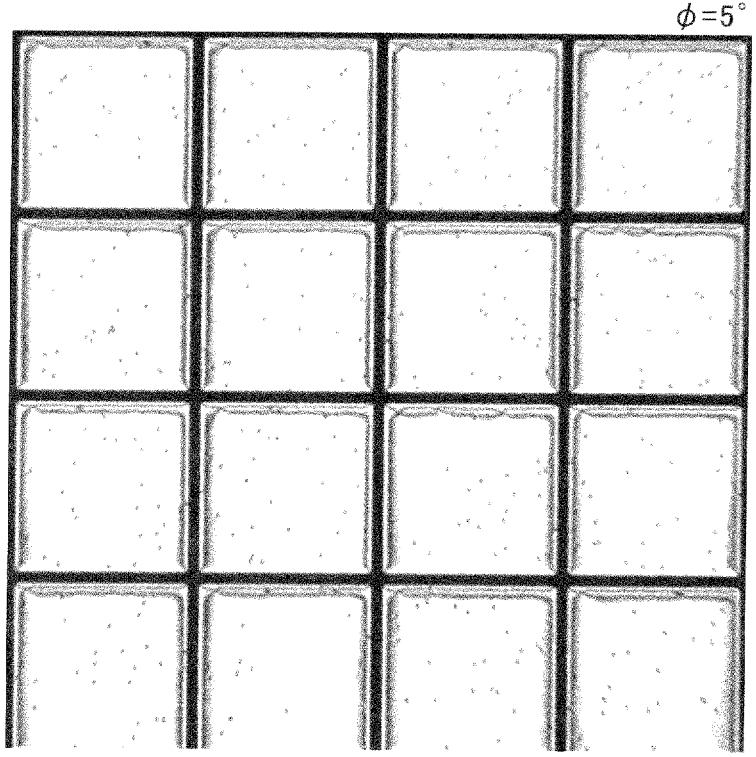
FIG. 4 is an observation photograph of a liquid crystal cell wherein the rubbing direction is set to φ=5 degrees and the pretilt angle is set to 89.9 degrees.
Figure 5:
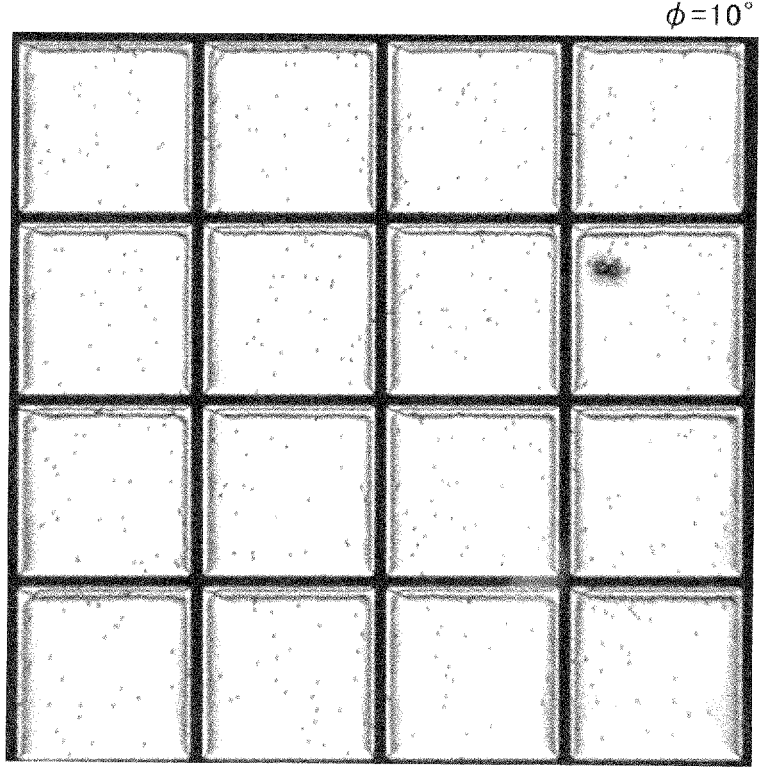
FIG. 5 is an observation photograph of a liquid crystal cell wherein the rubbing direction is set to φ=10 degrees and the pretilt angle is set to 89.9 degrees.
Figure 6:
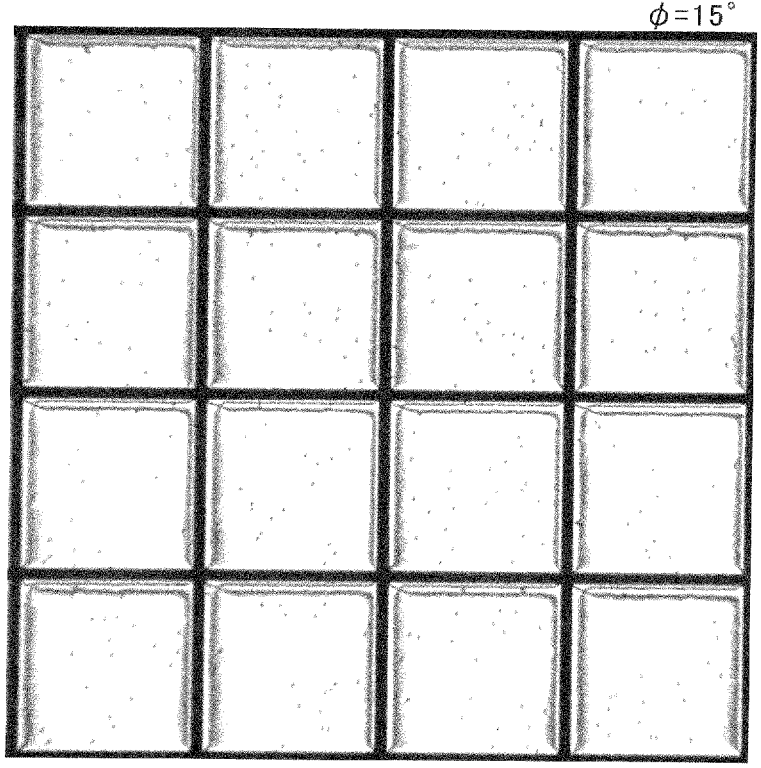
FIG. 6 is an observation photograph of a liquid crystal cell wherein the rubbing direction is set to φ=15 degrees and the pretilt angle is set to 89.9 degrees.
Figure 7:
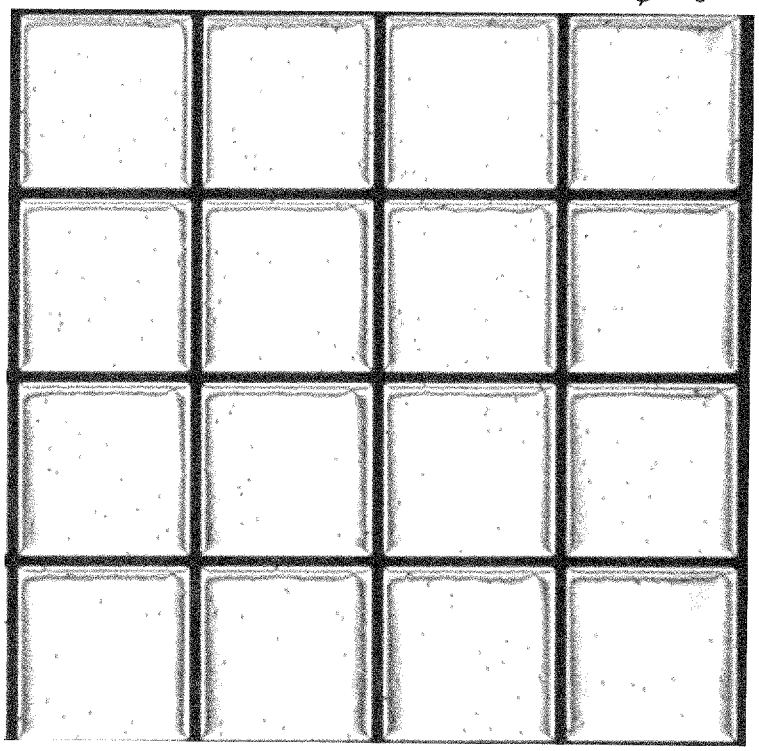
FIG. 7 is an observation photograph of a liquid crystal cell wherein the rubbing direction is set to φ=−5 degrees and the pretilt angle is set to 89.9 degrees.
Figure 8:
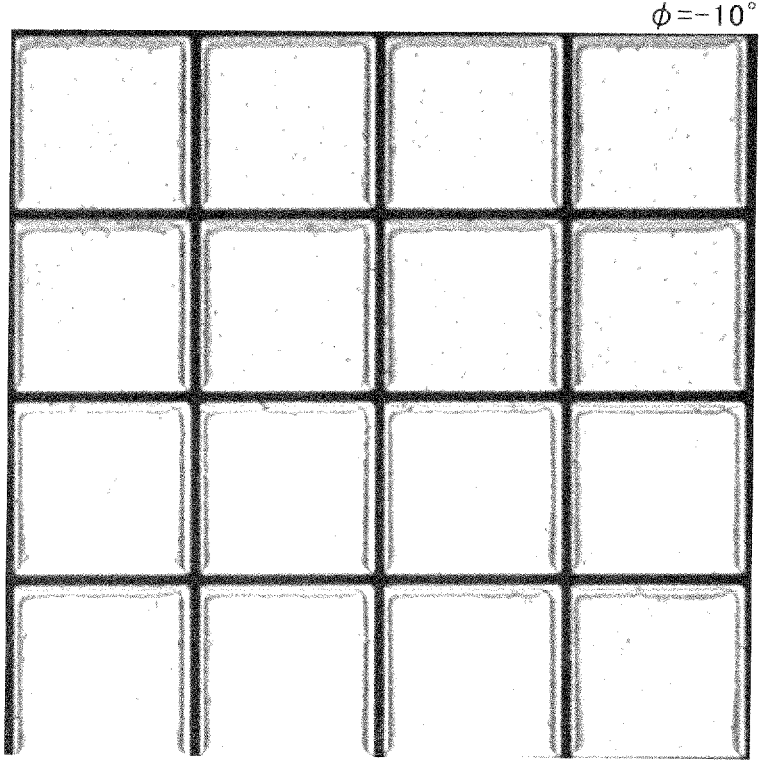
FIG. 8 is an observation photograph of a liquid crystal cell wherein the rubbing direction is set to φ=−10 degrees and the pretilt angle is set to 89.9 degrees.
Figure 9:
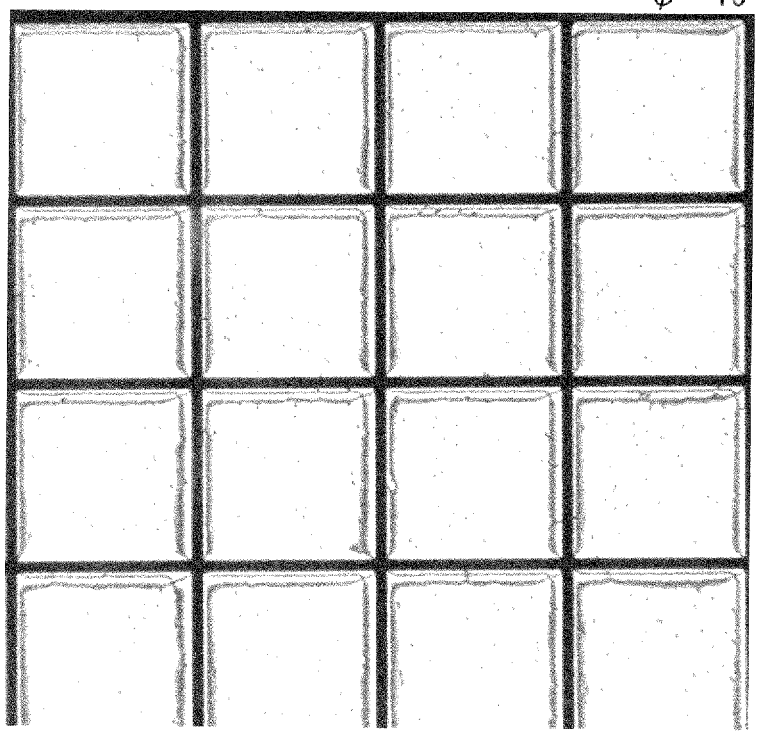
FIG. 9 is an observation photograph of a liquid crystal cell wherein the rubbing direction is set to φ=−15 degrees and the pretilt angle is set to 89.9 degrees.

FIG. 3 is a schematic cross sectional view showing a structure of the liquid crystal display element 50 according to the embodiment of the present invention. The liquid crystal display element 50 is a mono-domain vertical alignment type liquid crystal display element having dot matrix electrode patters arranged in a matrix.

The segment electrode substrate (upper substrate) 1 and the common electrode substrate (lower substrate) 2 face each other, and the liquid crystal layer 3 is placed between the upper and the lower substrates.

The segment electrode substrate 1 consists of a transparent substrate 13, the strips of the transparent electrodes (segment electrodes) 14 formed on a counterface surface (an inner surface facing to the lower substrate 2) of the transparent substrate 13, a vertical alignment film 15 coated on the transparent substrate 13 and the segment electrodes 14. A surface of the vertical alignment film 15 is treated with the rubbing process (oblique rubbing) in the direction 18R (FIG. 2) rotated clockwise by an angle φ from the up/down direction of the liquid crystal display element of the upper substrate 1. A viewing angle compensator 12 and a polarizer 11 are arranged on an outer surface of the transparent substrate 13.

The common electrode substrate 2, similarly to the segment electrode substrate 1, consists of a transparent substrate 23, the strips of the transparent electrodes (common electrodes) 24 formed on a counterface surface (an inner surface facing to the lower substrate 1) of the transparent substrate 23, a vertical alignment film 25 coated on the transparent substrate 23 and the segment electrodes 24. A surface of the vertical alignment film 25 is treated with the rubbing process (oblique rubbing) in the direction 28R (FIG. 2) rotated counterclockwise by an angle φ from the up/down direction of the liquid crystal display element of the upper substrate 2. A viewing angle compensator 22 and a polarizer 21 are arranged on an outer surface of the transparent substrate 23.

The liquid crystal layer 3 includes liquid crystal molecules which align almost vertical to the surfaces of the substrates 1 and 2 and has pretilt of a predetermined angle from a direction perpendicular to the substrate by the alignment processes (rubbing processes). A back light 4 is placed below the lower substrate 2. Moreover, an insulating film ($SiO_2$ layer), etc. for preventing short-circuit between the substrates may be formed between the transparent electrodes 14 and the vertical alignment film 15 of the substrate 1. Similarly an insulating film ($SiO_2$ layer), etc. for preventing short-circuit between the substrates may be formed between the transparent electrodes 24 and the vertical alignment film 25 of the substrate 2.

The segment electrode 14 and the common electrode 24 are formed of ITO of transparent electrodes. For example, one surface of each substrate is polished and $SiO_2$ undercoat is performed to the polished surface of each substrate. Thereafter an indium tin oxide (ITO) film which is a transparent film is formed on each substrate by CVD, vapor deposition, sputtering or the likes and patterned in desired patterns by a photolithography process and an etching process.

After cleaning the substrates 1 and 2 with the transparent electrodes 14 and 24 by using alkaline solution or the like, the vertical alignment films 15 and 25 manufactured by Chisso Petrochemical Corporation are coated on the electrodes 14 and 24 and the substrates 13 and 23 by flexo-printing and baked at 180 degrees Celsius for 30 minutes in a clean oven.

The rubbing processes (oblique rubbing) in the directions 18R and 28R in an in-plane direction of the substrate are performed by using cotton rubbing cloth to the segment and the common substrates 1 and 2 respectively.

The alignment processes are performed to have an anti-parallel alignment wherein a direction angle of the pretilt of the segment electrode substrate (upper substrate) 1 is the direction 18R (FIG. 2) rotated counterclockwise by an angle φ from the up/down direction of the liquid crystal display element of the upper substrate 1 and a direction angle of the pretilt of the common electrode substrate (lower substrate) 2 is the direction 28R (FIG. 2) rotated counterclockwise by an angle φ from the up/down direction of the liquid crystal display element of the upper substrate 2. Moreover, any types of rubbing processes can be used as far as the processes can give a uniformed alignment in a pixel. For example, ultraviolet ray irradiation to the vertical alignment films, oblique vapor deposition of metal oxide, an alignment method using a sputtering film, etc. may be used. Further, the alignment process may be performed to only one of the upper and the lower substrates as far as the process makes the director of the liquid crystal layer center molecules uniformly aligned not perpendicular to the edges of each pixel. Furthermore, in case of performing the alignment processes to both upper and lower substrates, it does not have to have the anti-parallel alignment as far as the director of the liquid crystal layer center molecules crosses the edges of each pixel at a certain angle.

After the rubbing processes, on all over the surface of the segment electrode substrate 1, plastic spacers manufactured by Sekisui Chemical Co., Ltd. with a sphere diameter of about 4.5 µm are sprayed by a dry-spraying method. On the common electrode substrate 2, thermal-curing type sealing material manufactured by Mitsui Chemicals, Inc. mixed with rod-shaped glass spacers manufactured by Nippon Electric Glass Co., Ltd. with a rod diameter of about 4 µm is coated with predetermined patterns by a dispenser. Thereafter, the segment electrode substrate 1 and the common electrode substrate 2 are positioned to face the surfaces on which the electrodes are formed and make the alignment directions (rubbing directions) anti-parallel and attached approximately in parallel to each other. Then the sealing material is cured by thermo-compression bonding, and the fabrication of an empty cell is completed.

Thereafter, liquid crystal material having Δn of about 0.214 and Δ∈<0 manufactured by Merck Ltd. is injected to the empty cell by using a vacuum injection method and thereafter the cell is sealed while being treated with a pressing process and baked at 120 degrees Celsius for an hour. Then the polarizers 11 and 12 are adhered to the surfaces of the upper and the lower glass substrates. For the polarizers 11 and 12 polarizers SHC13U manufactured by Polatechno Co., Ltd. are used.

The polarizers 11 and 12 are arranged in crossed Nicols, and an absorption axis of each one of the polarizers 11 and 12 is made to cross the alignment direction 18R or 28R of the liquid crystal layer center molecules defined by the rubbing process at about 45 degrees. The crossing angle of the polarizers is preferably 90 degrees for obtaining a good black state but it is possible to adjust the crossing angle by about several degrees. Moreover, either one of iodine polarizers and dye type polarizers can be used as the polarizers 11 and 12.

Further, based on necessity, a viewing angle compensator 12 is arranged between the upper substrate 13 and the upper polarizer 11, and also a viewing angle compensator 22 is arranged between the lower glass substrate 23 and the lower polarizer 12. Finally lead frames are connected to terminals of the liquid crystal cell and the fabrication of the liquid crystal display element 50 is completed. A thickness of the liquid crystal cell actually made by the inventors by the above-described method was about 4.0 µm. Moreover, the retardation of the liquid crystal layer was about 860 nm. Furthermore, physical properties such as Δn, etc. of the liquid crystal material are not limited to the above embodiment as far as the liquid crystal material is the negative dielectric anisotropy material with the negative Δ∈.

The inventors of the present invention actually have fabricated a total of 12 liquid crystal display elements 50 according to the embodiment and two liquid crystal display elements as comparative examples by attaching the upper and the lower substrates to make empty cells and injecting liquid crystal material into the empty cells. The rubbing directions were set to be anti-parallel and the pretilt angle was set to either 89.8 degrees or 89.9 degrees. Regarding to the liquid crystal display elements 50 according to the embodiment, for each of the pretilt angles 89.8 degrees and 89.9 degrees, the rubbing directions were set to φ=−15 degrees, −10 degrees, −5 degrees, 5 degrees, 10 degrees and 15 degrees. Regarding to the comparative example, for each of the pretilt angles 89.8 degrees and 89.9 degrees, the rubbing direction was set to φ=0 degree.

The longitudinal direction of the transparent electrodes to be the reference line, the segment electrodes in this embodiment, is defined as φ=0 degrees of the rubbing direction φ. The angle rotated clockwise from the reference line is defined as a positive (+) angle, and the angle rotated counterclockwise from the reference line is defined as a negative (−) angle. Moreover, the rubbing direction φ refers to smaller angle between the longitudinal direction of the strips of the electrodes and the rubbing directions of the facing substrates. In this embodiment, the rubbing direction and the director of the liquid crystal layer center molecules are the same direction and so the angle φ can be considered an angle from the rubbing direction; however, the angle φ is essentially an angle between the director of the liquid crystal layer center molecules and the longitudinal direction of the reference electrodes (refer to FIG. 2).

FIG. 4 to FIG. 9 are observation photographs of the liquid crystal cells with the pretilt angle of 89.9 degrees of the above-described liquid crystal display elements 50 according to the embodiment fabricated under the above-described conditions. FIG. 4 to FIG. 9 are the observation photographs of the liquid crystal cells whose rubbing directions are set to φ=−15 degrees, −10 degrees, −5 degrees, 5 degrees, 10 degrees and 15 degrees respectively. Moreover, an observation photograph of the liquid crystal display element according to the comparative example with the pretilt angle of 89.9 degrees and the rubbing direction φ=0 degrees is shown in FIG. 20 as the prior art. In those observations, appearance positions of the black cross intersections were measured under a driving condition: 1/64Duty; 1/9Bias; a frame inversion waveform; transmission rate of about 7%; a frame frequency of 105 Hz; and at a room temperature.

FIGS. 10A and 10B are plan views for explaining a method for measuring appearance positions of the black cross intersections and FIGS. 10C and 10D are tables showing the results of the measurements.

As shown in FIG. 10A, dots 60 of the liquid crystal cells shown in FIG. 4 to FIG. 9 were named D1 to D16 respectively. As shown in FIG. 10B, each dot 60 according to the embodiment has a width of 420 μm, and an interval (gap) between the dots 60 is 30 μm. Therefore, a distance from the center of one dot 60 to the center of the adjacent dot 60 is 450 μm. In the measurements, the appearance positions are measured from the center of the interval between the adjacent dots 60. The measurements were carried out by printing the observation photographs on A4 paper with making the distance between the center of one dot 60 to the center of the adjacent dot 60 from 450 μm to 41 mm, and the appearance positions were measured with a ruler by using the enlarged photographs (with a resolution of 0.5 mm). Further, the symbol "UD" in FIG. 10A and FIG. 10B represents the up/down direction (the longitudinal direction (extending direction) of the strips of the segment electrodes or the perpendicular direction to the longitudinal direction (extending direction) of the strips of the common electrodes) of the liquid crystal display element in the upper and the lower substrates.

FIG. 10C is a table showing the results of the measurements, converted to the actual values, of the appearance positions of the black cross intersections in the observation photographs for the liquid crystal cells with the rubbing directions of φ=5 degrees, 10 degrees and 15 degrees. As shown in the table, all the appearance positions of the black cross intersections were about 40 to 60 μm away from the center of the left interval between the dots 60. Taking it into consideration that 450 μm was the distance between the centers of the adjacent dots 60, it can be said that the appearance positions of the black cross intersections were fixed near the left edge of each dot 60.

FIG. 10D is a table showing the results of the measurements, converted to the actual values, of the appearance positions of the black cross intersections in the observation photographs for the liquid crystal cells with the rubbing directions of φ=−5 degrees, −10 degrees and −15 degrees. As shown in the table, all the appearance positions of the black cross intersections were about 40 to 60 μm away from the center of the right interval between the dots 60. Taking it into consideration that 450 μm was the distance between the centers of the adjacent dots 60, it can be said that the appearance positions of the black cross intersections were fixed near the right edge of each dot 60.

Therefore, the positions of the black cross intersections could be aligned (fixed) near the edge in almost all the dots 60 by rotating the rubbing directions from the longitudinal direction of the electrodes. It is considered that fixing the positions of the black cross intersections at the same relative position in each dots 60 contributes to elimination of rough feeling of display (display non-uniformity) when viewed from a certain direction, which was observed in the normal rubbing process according to the prior art, and to improvement in display uniformity.

The phenomenon in which the positions of the black cross intersections are fixed at the same relative position in each pixel (dot 60) can be considered as an effect of shifting the director of the liquid crystal layer center molecules slightly away from the direction perpendicular to the extending direction of the strips of the common electrodes by setting the angle φ by which the rubbing direction is rotated from the up/down direction of the liquid crystal display element to greater or smaller than 0 degree and in a range of −5 degrees to −15 degrees or in a range of 5 degrees to 15 degrees.

Figure 11:
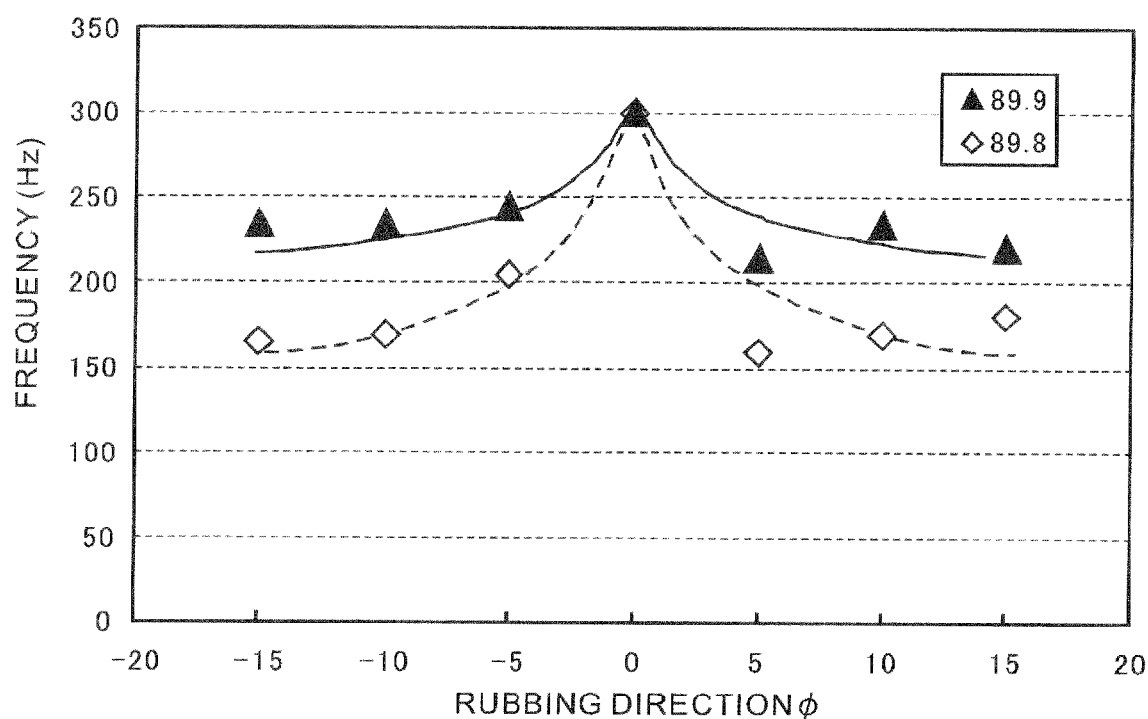
FIG. 11 is a graph showing frame frequencies which could eliminate non-uniformity when the liquid crystal cells were viewed from the anti-viewing direction.

FIG. 11 is a graph showing frame frequencies which could eliminate rough feeling of display (display non-uniformity caused by the non-fixed positions of the black cross intersections) when the above-described 14 types of the actually fabricated liquid crystal cells (the liquid crystal cells having the pretilt angles of 89.8 degrees with the rubbing directions changed by five degrees in the range of −5 degrees to 15 degrees and the liquid crystal cells having 89.9 degrees with the rubbing directions changed by five degrees in the range of −5 degrees to 15 degrees) were viewed from the anti-viewing direction.

The inventors of the present invention judged the minimum frame frequencies which could keep the display uniformity when the liquid crystal display elements were viewed from a specific direction under a driving condition: 1/64Duty; 1/9Bias; frame inversion waveform; transmission rate higher than the transmission rate (about 7%) in the observations explained with reference to FIG. 10; and at about a temperature of 40 degrees Celsius. The rough feeling of display (display non-uniformity) caused by the non-fixed positions of the black cross intersections and the phenomenon of appearance of a dark region in a part of display region under the driving condition with relatively low frame frequencies were simultaneously observed.

Although the frame frequency of the driving waveform was set to the maximum 300 Hz, the rough feeling of display (display non-uniformity) when viewed from the anti-viewing direction did not disappear in the liquid crystal cells with the angle φ=0 degree regardless of the pretilt angles. On the other hand, it was found that the frame frequency of the driving waveform could be restrained to 250 Hz or lower by using the liquid crystal cells with the angle φ other than 0 degree. In case that the pretilt angle was 89.8 degrees, comparing to that the pretilt angle was 89.9 degrees, it was possible to eliminate the rough feeling of display (display non-uniformity) with further lower frequencies. Therefore, it is considered that it is possible to lower the frame frequency by making the pretilt angle smaller. It becomes possible to restrain display non-uniformity caused by crosstalk of the liquid crystal display element and improve the display uniformity and the display quality by lowering the frame frequency.

Figure 12:
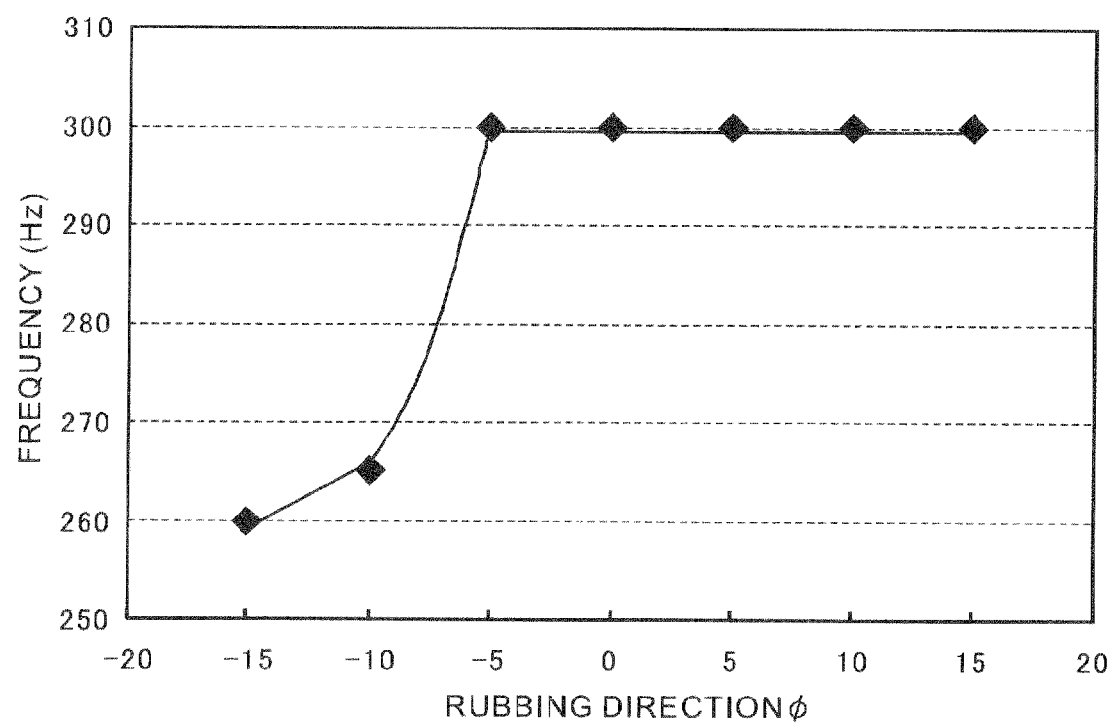
FIG. 12 is a graph showing frame frequencies which could eliminate non-uniformity when the liquid crystal cells added with chiral dopant were viewed from the anti-viewing direction.

FIG. 12 is a graph showing frame frequencies which could eliminate rough feeling of display (display non-uniformity caused by the non-fixed positions of the black cross intersections) when seven types of liquid crystal cells including liquid crystal added with right-handed chiral dopant and having the pretilt angles of 89.8 degrees with the rubbing directions in the range of −5 degrees to 15 degrees were viewed from the anti-viewing direction.

The inventors of the present invention actually fabricated a total of seven liquid crystal display elements according to the embodiment including a comparative example by preparing empty cells having the pretilt angle of 89.8 degrees and the rubbing direction changed by 5 degrees in the range of φ=−15 degrees to 15 degrees and injecting the liquid crystal material having Δn of about 0.214 and Δε<0 manufactured by Merck Ltd. added with about 1.4 wt % of chiral dopant R-811 manufactured by Merck Ltd. to the empty cells. The inventors of the present invention judged the minimum frame frequencies which could keep the display uniformity when the liquid crystal display elements were viewed from a specific direction under a driving condition: 1/64Duty; 1/9Bias; frame inversion waveform; transmission rate of about 7%; and at a room temperature. Similar to the observations explained with reference to FIG. 11, the rough feeling of display (display non-uniformity) caused by the non-fixed positions of the black cross intersections and the phenomenon of appearance of a dark region in a part of display region under the driving condition with relatively low frame frequencies were simultaneously observed.

When the rubbing direction was set to φ=−10 degrees or −15 degrees, it was observed that the rough feeling of display (display non-uniformity) tended to disappear. On the other hand, when the rubbing direction was set to φ=−5 degrees, 5 degrees, 10 degrees or 15 degrees, there was no difference in outside appearance from the rubbing direction of φ=0 degree which was similar to the prior art or there was tendency to become worse in the rough feeling of display (display non-uniformity). It is considered that non-uniformity in the alignment was observed with naked eyes because the black crosses were cut in the middle or shapes of the black crosses were instable when the rubbing direction was set to φ=−5 degrees, 5 degrees, 10 degrees or 15 degrees.

Moreover, the observations under the same conditions as the observations in FIG. 11 were carried out with the liquid crystal cells added with the chiral dopant used in the observations in FIG. 12. The effect of restraining the frame frequency could be confirmed when the rubbing direction was set to φ=−10 degrees or −15 degrees, but the display uniformity could not be obtained even at the maximum frame frequency similarly to the prior art when the rubbing direction was set to φ=−5 degrees, 5 degrees, 10 degrees or 15 degrees.

From the above-described results of the observations, it is found that the positions of the black crosses are fixed when the rubbing direction is rotated clockwise or counterclockwise in case that chiral dopant is not added and so the rough feeling of display (display non-uniformity) when viewed from a specific direction can be easily solved without adding manufacturing steps. The angle φ rotating the rubbing direction is preferably in a range of −5 to −15 degrees or in a range of 5 to 15 degrees.

In case of using the liquid crystals added with the right-handed chiral dopant, unlike the case of not added with chiral dopant, there is no effect of fixing black crosses when the rubbing direction is rotated clockwise from the director of the liquid crystal layer center molecules and no improvement on the display uniformity. When the rubbing direction is rotated counterclockwise from the director of the liquid crystal layer center molecules, the black crosses are stabilized by rotating the rubbing direction by the angle φ=−10 degrees or −15 degrees. Therefore, it is assumed that the positions of the black cross intersections are fixed preferably by rotating the rubbing direction by the angle φ=−10 to −15 degrees from the director of the liquid crystal layer center molecules in case of using the liquid crystals added with the right-handed chiral dopant and by rotating the rubbing direction by the angle φ=10 to 15 degrees from the director of the liquid crystal layer center molecules in case of using the liquid crystals added with the left-handed chiral dopant.

Figure 13:
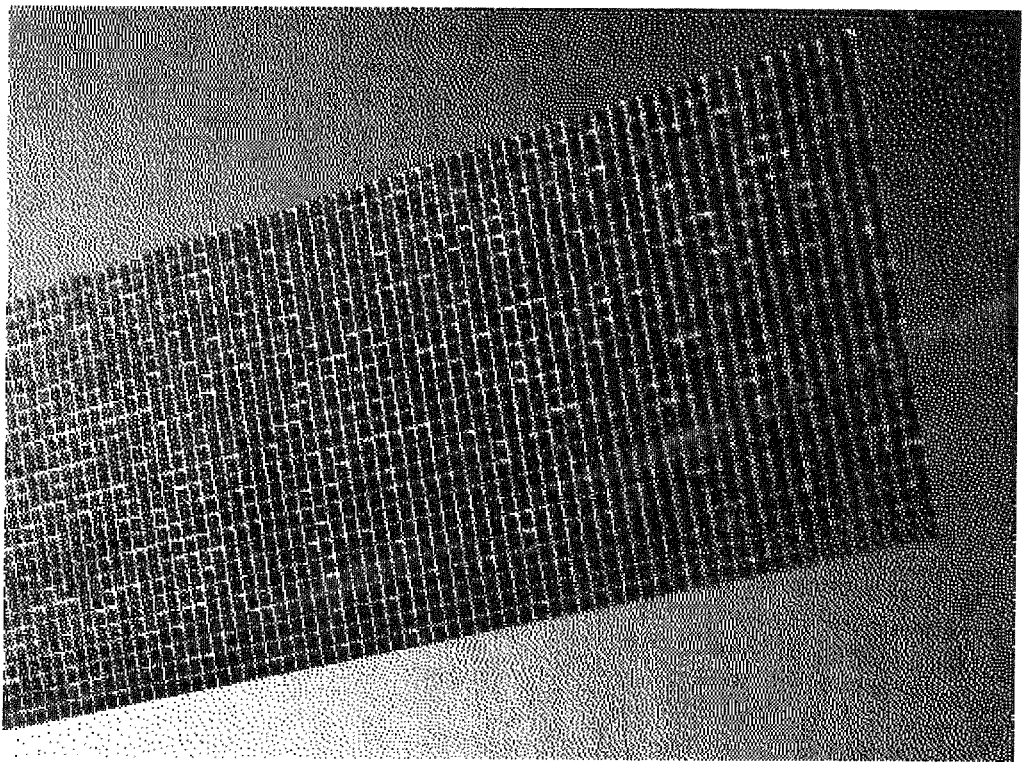
FIG. 13 is an observation photograph of a liquid crystal cell in the dot matrix display region of the liquid crystal display element according to the prior art.
Figure 14:
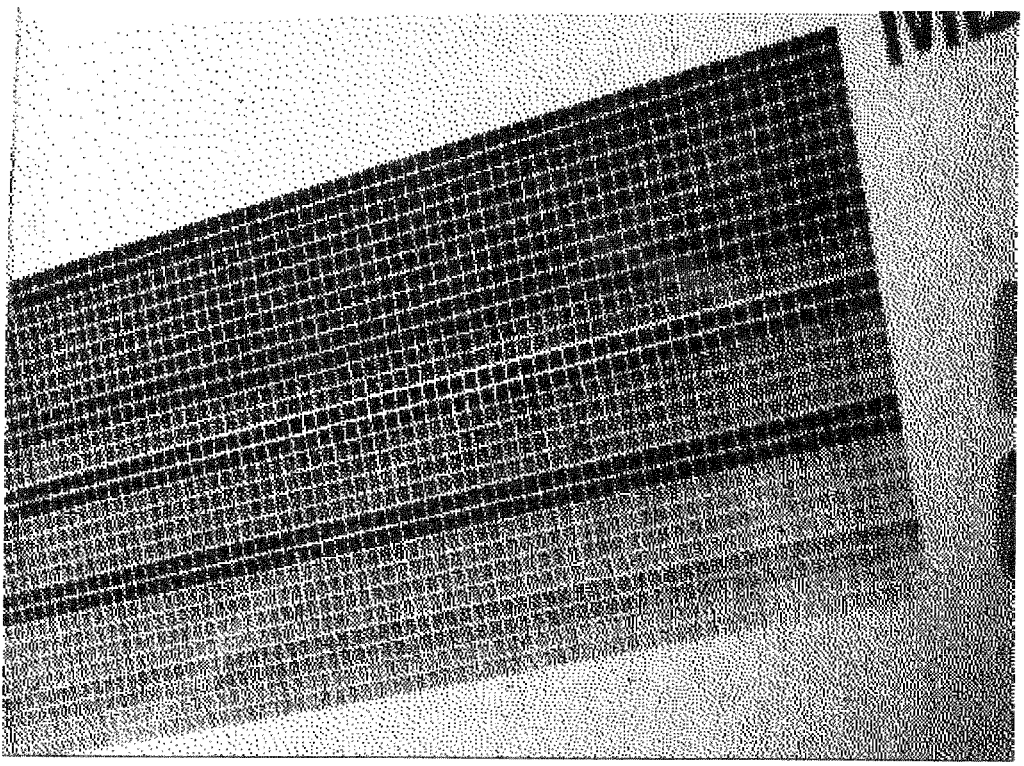
FIG. 14 is an observation photograph of a liquid crystal cell in a dot matrix display region 52 of the liquid crystal display element 50 according to the embodiment of the present invention.

FIG. 13 is an observation photograph of the liquid crystal cell in the dot matrix display region of the liquid crystal display element according to the prior art. FIG. 14 is an observation photograph of the liquid crystal cell in the dot matrix display region 52 of the liquid crystal display element 50 according to the embodiment of the present invention. The optimal viewing direction of both liquid crystal cells is the 12 o'clock direction and the anti-viewing direction is the 6 o'clock direction. Moreover, both liquid crystal cells used liquid crystals without chiral dopant and the observations were carried out under a driving condition: 1/64duty; 1/9Bias; Wave B; 250 Hz; and 24.9V.

Although there is crosstalk caused by a contact failure in the photograph of the oblique rubbing shown in FIG. 14, it can be recognized that there is no problem found in display such as non-uniformity in the edges of each pixel as found in the case of normal rubbing shown in FIG. 13. The upper and the lower substrates of the liquid crystal display elements used in the observation were not equipped with the compensators; therefore, light leakages are found in regions other than the display regions when viewed from a specific direction. That was because the director of the liquid crystal layer center molecules and the edges of each pixel crossed at the same angle, the black crosses were generated in the almost same situation, and the differences in the appearance positions of the black cross intersections in the pixels decreased.

Figure 15A:
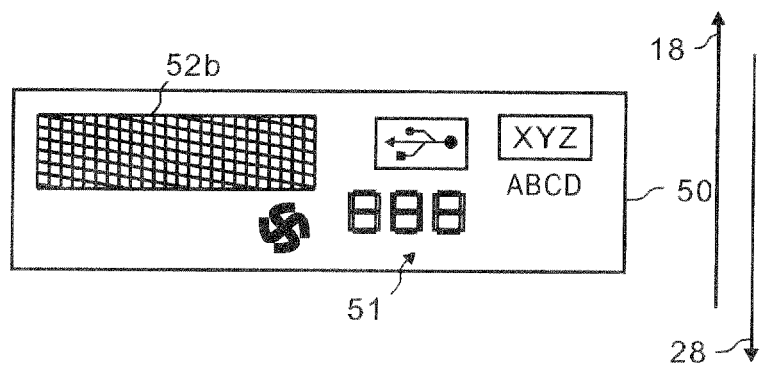
FIGS. 15A and 15B are plan views showing a first modified example of the embodiment of the present invention.
Figure 15B:
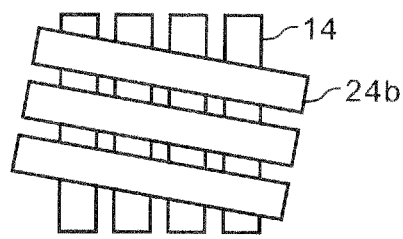

FIGS. 15A and 15B are plan views showing a first modified example of the embodiment of the present invention. FIG. 15A is a plan view showing the liquid crystal display element 50 according to the first modified example of the embodiment of the present invention, and FIG. 15B is an enlarged plan view showing a part of electrode patters in a dot matrix display region 52b.

As shown in FIG. 15B, the strips of the common electrodes 24b are not arranged in parallel but rotated slightly (e.g., ±5 to 15 degrees) from the left/right direction of the liquid crystal display element 50, and an alignment processes such as rubbing processes are performed in the 6-12 o'clock directions (the directions represented by arrows 18 and 28), which are the same direction as the longitudinal direction of the segment electrodes as shown in FIG. 15A just like the prior art. By that, the same effect as the oblique rubbing wherein the angle φ is not 0 degree can be obtained with the conventional rubbing processes. In the case of this first modified example, the longitudinal direction of the common electrodes 24*b* is preferably directed to a direction rotated by 90±5 to 15 degrees (75 to 85 degrees or 95 to 105 degrees) from the longitudinal direction of the segment electrodes 14. That is, the common electrodes 24*b* are formed to extend in a direction rotated by ±5 to 15 degrees from a direction perpendicular to the up/down directions of the liquid crystal display element 50.

Figure 16A:
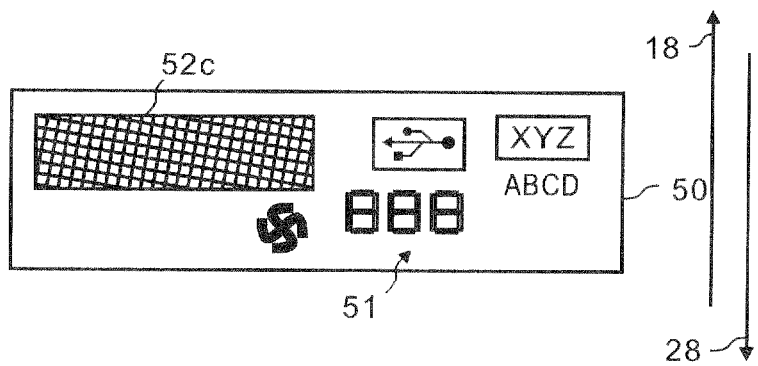
FIGS. 16A and 16B are plan views showing a second modified example of the embodiment of the present invention.
Figure 16B:
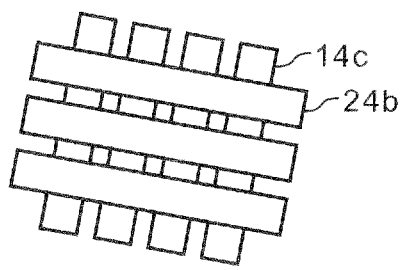

FIGS. 16A and 16B are plan views showing a second modified example of the embodiment of the present invention. FIG. 16A is a plan view showing the liquid crystal display element 50 according to the second modified example of the embodiment of the present invention, and FIG. 16B is an enlarged plan view showing a part of electrode patters in a dot matrix display region 52*c*.

As shown in FIG. 16B, both of the strips of the common electrodes 24*b* and the strips of the segment electrode 14*c* themselves are not arranged in parallel but rotated slightly (e.g., ±5 to 15 degrees) from the left/right direction of the liquid crystal display element 50, and an alignment processes such as rubbing processes are performed in the 6-12 o'clock directions (the directions represented by arrows 18 and 28), which are the same direction as the longitudinal direction of the segment electrodes as shown in FIG. 16A just like the prior art. By that, the same effect as the oblique rubbing wherein the angle φ is not 0 degree can be obtained with the conventional rubbing processes. In the case of this second modified example, the longitudinal direction of the common electrodes 24*b* and the longitudinal direction of the segment electrodes 14*c* cross at a right angle. The common electrodes 24*b* are formed to extend in a direction rotated by ±5 to 15 degrees from a direction perpendicular to the up/down directions of the liquid crystal display element 50. Moreover, the segment electrodes 14*c* are formed to extend in a direction rotated by ±5 to 15 degrees from the up/down directions of the liquid crystal display element 50.

Further, the positions of the black crosses are fixed and so the area ratios of the right rotation and the left rotation parts are fixed; therefore, the arrangement of the polarizers will not affect the display non-uniformity. Therefore, the display non-uniformity is not observed when the absorption axes of the front and the back polarizers are arranged in directions rotated by about 45 degrees from the left/right and the up/down directions of the liquid crystal display element 50 even in case that the rotation angle φ of the rubbing directions is not 0 degree (incase of the oblique rubbing).

According to the above-described embodiment and the modified examples of the embodiment of the present invention, the director of the liquid crystal layer center molecules does not cross the strips of the segment and the common electrodes at a right angle but crosses a direction perpendicular to the longitudinal direction of the strips of the segment electrodes at a certain angle. Moreover, the strips of the electrodes are formed with the same width and in parallel to each another on each of the upper and the lower substrates. By that, all pixels, each demarcated by a cross section of the strips of the segment electrode and the common electrode, are in the same shape and size. It is considered that the segment electrodes and the common electrodes can be switched to obtain the same effect.

Although the transparent electrodes are used in the above-described embodiment and the modified examples of the embodiment of the present invention, any kind of the strips of the upper and lower electrodes which cross each other can be used. For example, the embodiment of the present invention can be adapted to a reflective liquid crystal display device that uses a reflective light from the outside without using a back light by forming electrodes on a lower substrate by using metal.

The present invention has been described in connection with the preferred embodiments. The invention is not limited only to the above embodiments. It is apparent that various modifications, improvements, combinations, and the like can be made by those skilled in the art.

What are claimed are:

1. A liquid crystal display element, comprising:
a pair of substrates facing each other with a predetermined gap;
a plurality of strips of first electrodes formed on a counterface surface of one of the pair of substrates;
a plurality of strips of second electrodes formed on a counterface surface of another one of the pair of substrates and crossing the first electrodes;
an alignment film formed on the counterface surface of at least one of the pair of substrates and treated with an alignment process in a direction not perpendicular to a longitudinal direction of the second electrodes;
a vertical alignment mode liquid crystal layer placed between the pair of substrates and having a pretilt angle; and
a pair of polarizers sandwiching the pair of substrates,
wherein the first electrodes and the second electrodes cross each other to form a plurality of pixels,
wherein non-uniform alignment regions where liquid crystal molecules in a center of a thickness of the liquid crystal layer are aligned in a different direction from the direction defined by the alignment process appear near an edge of the pixel in each pixel,
wherein the first electrodes and the second electrodes cross at a right angle, and
wherein the alignment film is treated with the alignment process in a direction rotated by 5 to 15 degrees clockwise or counterclockwise from a longitudinal direction of the first electrodes.

2. A liquid crystal display element, comprising:
a pair of substrates facing each other with a predetermined gap;
a plurality of strips of first electrodes formed on a counterface surface of one of the pair of substrates;
a plurality of strips of second electrodes formed on a counterface surface of another one of the pair of substrates and crossing the first electrodes;
an alignment film formed on the counterface surface of at least one of the pair of substrates and treated with an alignment process in a direction not perpendicular to a longitudinal direction of the second electrodes;
a vertical alignment mode liquid crystal layer placed between the pair of substrates and having a pretilt angle; and
a pair of polarizers sandwiching the pair of substrates,
wherein the first electrodes and the second electrodes cross each other to form a plurality of pixels,
wherein non-uniform alignment regions where liquid crystal molecules in a center of a thickness of the liquid crystal layer are aligned in a different direction from the direction defined by the alignment process appear near an edge of the pixel in each pixel,
wherein the longitudinal direction of the second electrodes is a direction rotated by 75 to 85 degrees or 95 to 105 degrees from a longitudinal direction of the first electrodes, and wherein the alignment film is treated with the alignment process in a direction in parallel to the longitudinal direction of the first electrodes.

* * * * *